Jan. 21, 1941.   L. C. BRUNSTRUM   2,229,367
DRIVING JOURNAL LUBRICANT
Filed April 29, 1940   2 Sheets-Sheet 1

Inventor:
Lawrence C. Brunstrum
By Arthur H. Bramley
Attorney.

Patented Jan. 21, 1941

2,229,367

UNITED STATES PATENT OFFICE 2,229,367

DRIVING JOURNAL LUBRICANT

Lawrence C. Brunstrum, Chicago, Ill., assignor to Standard Oil Company, Chicago, Ill., a corporation of Indiana Application April 29, 1940, Serial No. 332,199

8 Claims. (Cl. 252—41)

This invention relates to a hard high melting point lubricant of the type used by railroads for the lubrication of driving journals. This so-called "driving journal compound" usually consists largely of a soda soap and a heavy viscous mineral oil. In some cases certain additional minor constituents may be present.

Driving journal compounds are applied in cast or molded form in cellars beneath the locomotive driving axles, and are held there by perforated plate retarders which are shaped to conform to the configuration of the journal. The lubricant and plate are pressed snugly against the axle by means of springs. The bearing pressures on the journals are from 50 to 350 pounds per square inch of projected bearing area. The reversed thrust on the journals and the end-play and jolting of the trucks around curves and over frogs tend to rupture the lubricating film between the journal and the bearing. These factors along with the ever-present possibility of mechanical defects in the fit of the axles, crown brasses, and plates make the problem of correct lubrication extremely difficult.

A lubricant of this type must have proper structural characteristics so that it will feed uniformly through the plate to prevent the development of local hot spots and so that it will feed out fast enough to reduce the ill effects caused by high spots on the plate or journal; in other words it must take care of all but the most glaring mechanical deficiencies. On the other hand it must not feed too rapidly for three reasons: (1) high consumption makes for high labor costs in refilling cellars; (2) high consumption ultimately results in too thin a lubricant cake and the danger of a hot box; and (3) high consumption means high lubricant costs. The second important requirement is that the driving journal compound should be of such a nature as to hold the journal to a minimum temperature rise when the locomotive is under full load and speed.

It is an object of the present invention to provide a driving journal lubricant having a high softening time for the soap content thereof and which can be molded into cohesive tough blocks capable of withstanding shock loading.

Another object of the invention is to provide a driving journal compound having a low consumption and still feed uniformly to give the necessary lubrication.

Figure 1:
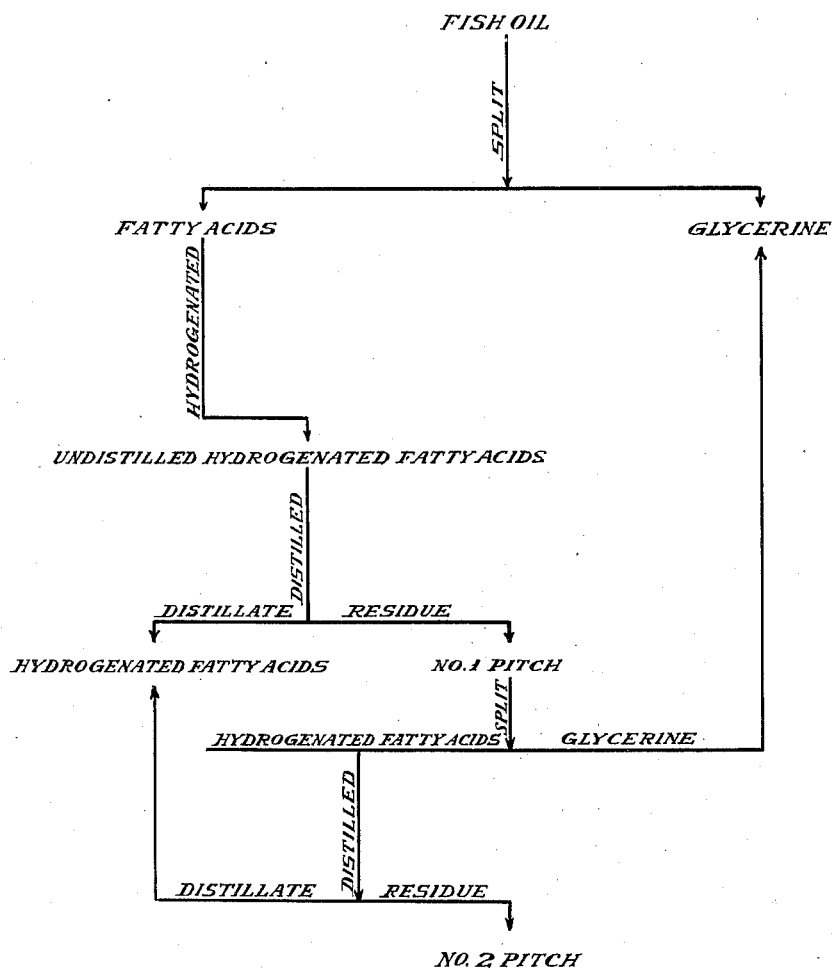
Figure 2:
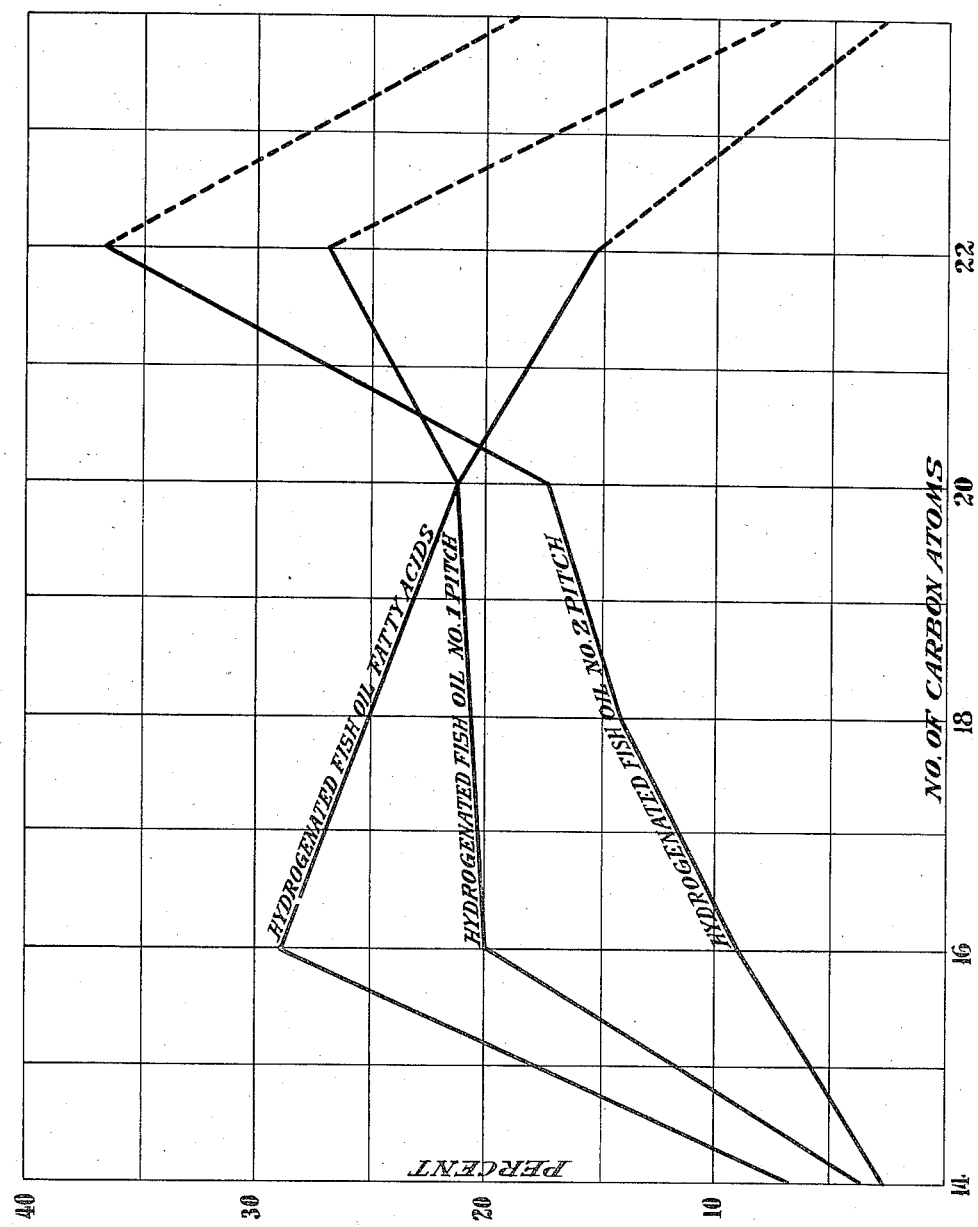

Other objects and advantages of the invention will become apparent from the following description thereof read in conjunction with the accompanying drawings which form a part of this specification, in which Figure 1 is a flow diagram showing a source of the essential ingredient of my grease, and Figure 2 is a chart showing the fatty acid composition of this material.

I have discovered that a lubricant having the above stated desirable properties can be obtained by preparing a grease in which the fatty materials usually employed for forming the soap portion of the grease are replaced, completely or in substantial part, by the pitch obtained from the distillation of hydrogenated fish oils. The source of this material is shown by the flow diagram of Figure 1 accompanying this specification. The fish oil which may be used, for example sardine oil, herring, cod, menhaden and the like, is first split by any of the well known methods to produce glycerine and fatty acids. After separation of the glycerine the fatty acids are hydrogenated and the hydrogenated fatty acids subsequently distilled to produce an overhead distillate of hydrogenated fish oil fatty acids and a residue referred to herein as No. 1 pitch. The No. 1 pitch in which are concentrated some fatty materials may be used as such for our purposes. However, it is preferred to submit the No. 1 pitch to a splitting operation to produce more glycerine and hydrogenated fatty acids. After separation of the glycerine the hydrogenated fatty acids are distilled to produce an overhead product of hydrogenated fish or fatty acids which may be combined with the distillate from the first distillation. The residue resulting from the second distillation is the material I prefer to use and is referred to herein as No. 2 pitch.

These pitches although commonly referred to as stearine pitch are not to be confused with the tarry, fatty acid pitches obtained by the distillation of animal or vegetable fatty materials. The pitch obtained as a residue in the distillation of hydrogenated fish oils is distinguished from the so-called stearine pitches from animal and vegetable fatty materials in that the latter are unsaturated, relatively high in unsaponifiable matter, and deficient in fatty acids above $C_{18}$. In contrast the pitches obtained from distillation of hydrogenated fish oils are saturated, rich in $C_{20}$, $C_{22}$, $C_{24}$ and higher molecular weight fatty acids, and are relatively poor in unsaponifiable matter. These pitches contain at least 65% of $C_{20}$ to $C_{24}$ and higher fatty acids. Stearine pitches obtained in the distillation of vegetable and animal fats are dark, tarry, materials whereas the pitches obtained from the distillation of hydrogenated fish oils are crystalline in structure and are of relatively light color.

The inspections on representative samples of No. 1 pitch and No. 2 pitch are given in Table I below.

TABLE I

*Constants on stearine pitch*

|  | No. 1 pitch | | No. 2 pitch |  |
|---|---|---|---|---|
| Saponification No., mgm. KOH/gm | | | 151 | 152.6 |
| Free fatty acid (oleic), percent | 16.6 | 18.4 | 10.5 | 15.3 |
| Total fatty acid, percent | 93 | | 86.5 | 86.3 |
| Fat, percent | 79.7 | 79.7 | 79.3 | 74.2 |
| Neutralization No. (acids), mgm. KOH/gm | | | 178 | 177 |
| Moisture-insoluble-unsaponifiable, percent | 4.3 | 3.9 | 10.4 | 11.8 |
| Iodine value (Hanus) | 4.2 | 5.6 | | |
| Melting point, °F | 58.8 | 75.6 | 59.0 | 78.0 |

As indicated in the above table the No. 1 pitch has a very low moisture-insoluble-unsaponifiable content and an extremely low iodine value. This pitch as indicated by its low iodine value is as saturated as double pressed stearine acid. The high total fatty acid content of these pitches as compared to the fatty acid content of not substantially more than about 10% for the so-called stearine pitches from animal and vegetable fats makes the former valuable as a soap stock for grease making.

The composition of the No. 1 and No. 2 pitches and the composition of the distilled hydrogenated fish oil fatty acids is given in Table II.

TABLE II

*Composition of fatty acids*

|  | No. 1 pitch | No. 2 pitch | Distilled hydrogenated fish oil fatty acids |
|---|---|---|---|
| $C_{14}$ | 4.9 | 3.5 | 2.5 | 6.7 |
| $C_{16}$ | 21.7 | 20.0 | 9.2 | 28.8 |
| $C_{18}$ | 17.8 | 20.8 | 14.2 | 25.1 |
| $C_{20}$ | 22.7 | 21.1 | 17.6 | 21.1 |
| $C_{22}$ | 24.1 | 27.1 | 37.7 | 15.4 |
| $C_{24}$ and unidentified | 8.8 | 7.5 | 18.8 | 2.9 |

The data of Table II are graphically represented in Figure 2 accompanying the specification. As noted from the above data the No. 1 pitch and the No. 2 pitch are rich in $C_{20}$ to $C_{22}$ fatty acids.

Broadly, my invention is directed to driving journal greases in which the soap base is prepared by saponifying with caustic soda the pitch obtained from the distillation of hydrogenated fish oils, particularly the hydrogenated fish oil fatty acids. These greases have the following approximate weight composition:

|  | Percent |
|---|---|
| Soda soap of hydrogenated fish oil fatty acid pitch | 30 to 75 |
| And preferably | 35 to 55 |
| Oil | 25 to 70 |
| And preferably | 45 to 65 |

The oil may be any kind of heavy viscous lubricating oil having a Saybolt Universal viscosity at 210° F. ranging from about 50 seconds to about 400 seconds but preferably ranging from about 150 seconds to about 250 seconds. It is preferred to use a residual oil such as a steam-refined oil. It is also advantageous to include a small amount, about 2% to 10%, of a heavy black oil, for example such as is produced from Wyoming crudes.

Relatively inert materials such as finely powdered materials, graphite, mica, asbestos fibers and the like may be included in the formula without departing from the spirit of the invention. However, when included, these inert materials are not to be calculated in formulating the composition of the grease.

The invention is exemplified by the following example which illustrates the improved lubricant with respect to the ingredients employed:

|  | Percent by weight |
|---|---|
| Hydrogenated fish oil fatty acid No. 2 pitch | 51.4 |
| 530° F. flash steam-refined oil | 32.8 |
| Heavy black oil | 4.1 |
| Caustic soda, 48° Baumé | 11.7 |
| Percent soda soap | 45 |
| Softening time at 260° F., 2000 seconds—not flattened. | |

Softening time is an index of quality from the service standpoint and is measured by a test in which a cylindrical-shaped plug of the driving journal compounds ½ inch in diameter and about ⅝ inch long is heated on an oil or mercury bath to the desired test temperature (in the present instance about 260° F.) while subjected to the weight of a 70 gram metal cylinder which provides a pressure on the driving journal compound comparable to the pressure to which the lubricant is subjected and after operation when it is forced by a spring against a hot bearing. Softening time is defined as the time in seconds required to flatten the test plug of the lubricant ¼ inch under these conditions. A satisfactory driving journal compound should have a softening time of about 2000 seconds, that is the test plug should flatten not more than ¼ inch in about 2000 seconds. The test is continued for a maximum period of 2000 seconds and if in this time the plug has not flattened ¼ of an inch the softening time is based on a ¼ inch flattening in the test plug. Thus, if the test plug flattens ⅛ inch in 2000 seconds the softening time is said to be 4000 seconds. In the above example no appreciable flattening of the test plug was observed after 2000 seconds indicating a superior driving journal compound, having a very low consumption.

The practice in preparing this grease is to add all the oil and pitch to a pressure kettle and heat the mixture to a temperature of about 200 to 210° F. until the pitch is completely melted. All of the caustic is then added and the mixture cooked under pressure for about three hours at a temperature of about 220 to 240° F. The pressure kettle is then opened and the mixture heated slowly from a temperature of about 220° F. to about 320° F. until substantially all of the water is removed from the batch. After the grease is dried at the maximum temperature of about 320° F. the grease is filled into containers. During the entire operation the mixture is continually stirred.

If the grease is prepared by the open kettle method all of the oil and all of the pitch is heated to a temperature of about 200° F. until the pitch is melted. All of the caustic is then added and the temperature of the mixture raised to about 220° F. to 250° F. and maintained at said temperature for about six hours. Thereafter the temperature is slowly raised to about 320° F. to remove substantially all of the water. After the batch has been dried the grease is ready for filling. Journal driving compounds prepared from the hydrogenated fish oil fatty acid pitches in the manner above described have an exceptionally high softening time and although fairly soft are tough and may be molded or repeatedly worked without getting soft or sticky.

While the present invention has been described and illustrated with respect to the preferred embodiment thereof, the same is not to be considered as limiting the scope of the invention except insofar as defined by the appended claims.

I claim:

1. A smooth, tough moldable driving journal lubricant characterized by a high softening time comprising soda soap of hydrogenated fish oil fatty acid pitch and lubricating oil.

2. A smooth, tough moldable driving journal lubricant characterized by a high softening time comprising from about 30% to about 75% soda soap of hydrogenated fish oil fatty acid pitch and lubricating oil.

3. A driving journal lubricant having the following approximate percentage composition by weight:

| | Per cent |
|---|---|
| Soda soap of hydrogenated fish oil fatty acid pitch | 30 to 75 |
| Oil | 25 to 70 |

4. A driving journal lubricant having the following approximate percentage composition by weight:

| | Per cent |
|---|---|
| Soda soap of hydrogenated fish oil fatty acid pitch | 35 to 55 |
| Oil | 45 to 65 |

5. A smooth, tough driving journal lubricant characterized by a softening time in excess of about 2000 seconds at 260° F. comprising from about 35% to about 55% of soda soap of hydrogenated fish oil fatty acid No. 2 pitch and from about 45% to about 65% of a heavy viscous lubricating oil having a Saybolt Universal viscosity at 210° F. ranging from about 50 seconds to about 400 seconds.

6. A driving journal lubricant prepared from the following ingredients in the following approximate proportions by weight:

| | Per cent |
|---|---|
| Hydrogenated fish oil fatty acid No. 2 pitch | 51.4 |
| 530° F. flash steam-refined oil | 32.8 |
| Heavy black oil | 4.1 |
| Caustic soda, 48° Baumé | 11.7 | said driving journal lubricant being characterized by high softening time.

7. A driving journal lubricant as described in claim 6 in which the hydrogenated fish oil fatty acid No. 2 pitch is a saturated material relatively poor in unsaponifiable matter and containing at least 65% of $C_{20}$ to $C_{24}$ and higher fatty acids.

8. A grease comprising a lubricating oil and a soda soap of hydrogenated fish oil fatty acid pitch.

LAWRENCE C. BRUNSTRUM.